W. LLOYD.
Throw-Off for Clutches.

No. 218,289. Patented Aug. 5, 1879.

Witnesses:
A. P. Grant,
W. F. Kircher

Inventor:
Wm. Lloyd,
by John A. Wiedersheim
ATTORNEY.

UNITED STATES PATENT OFFICE.

WILLIAM LLOYD, OF PHILADELPHIA, PENNSYLVANIA.

IMPROVEMENT IN THROW-OFFS FOR CLUTCHES.

Specification forming part of Letters Patent No. 218,289, dated August 5, 1879; application filed June 6, 1879.

*To all whom it may concern:*

Be it known that I, WILLIAM LLOYD, of the city and county of Philadelphia, and State of Pennsylvania, have invented a new and useful Improvement in a Throw-Off for Clutches, which improvement is fully set forth in the following specification and accompanying drawings, in which—

Figure 1:
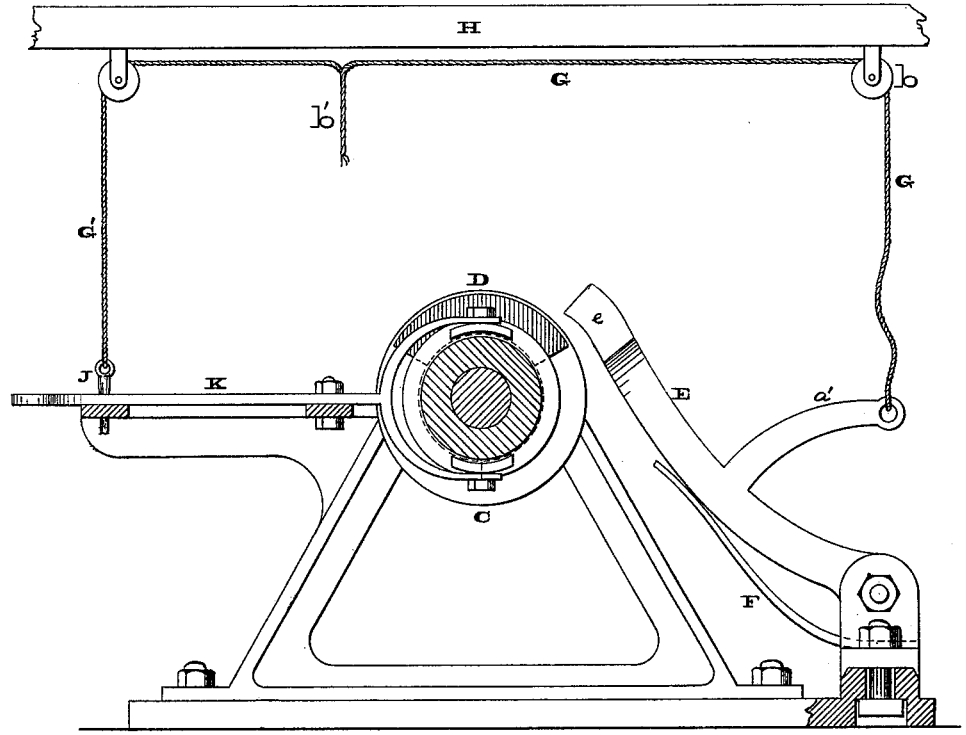
Figure 2:
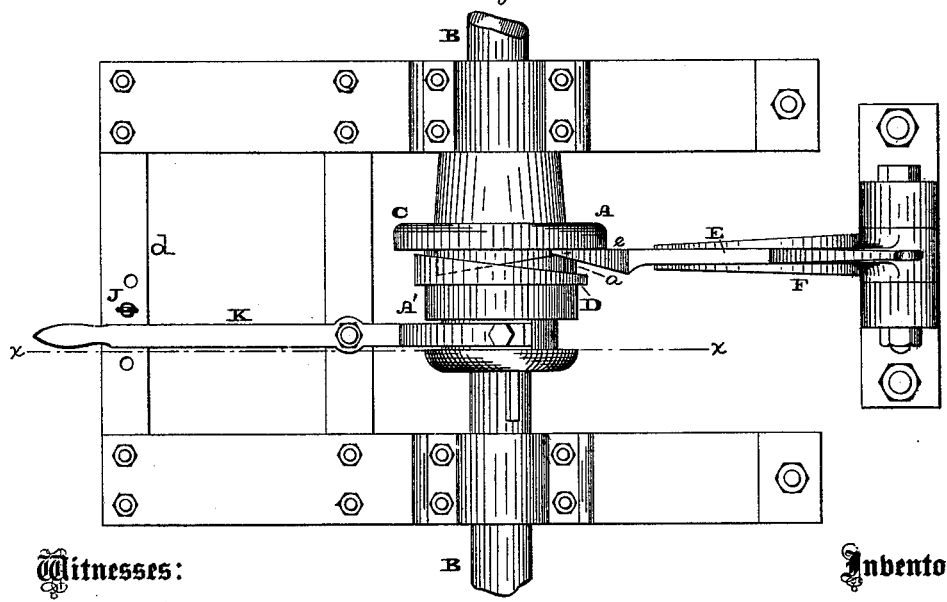

Figure 1 is a vertical section of the device embodying my invention in line $x$ $x$, Fig. 2. Fig. 2 is a top or plan view thereof.

Similar letters of reference indicate corresponding parts in the two figures.

My invention consists of the clutch-boxes, so constructed that by means of a separating-arm thrust between them the clutch will be thrown off, said arm being forced against the clutch-boxes by a cord or chain operating overhead, and returned therefrom by a suitable spring.

It also consists of means for simultaneously releasing the lever or shipper by which the shifting box of the clutch is moved and held against the fixed box and the throw-off arm, said means consisting of cords or chains connected to the separating-arm of the clutch and the fastening of the shipper, the location of the cords or chains being such that they do not occupy valuable space otherwise required.

Referring to the drawings, A A' represent the two boxes of a clutch, and B the two-part shaft thereof. From the periphery of the fixed box A of the clutch there projects a flange, C, the inner side of which is flat; and from the periphery of the shifting box A' there projects a flange, D, the face of which, adjacent to the flange C, is cut away or helical, so as to leave a tapering space, $a$, between the two flanges.

E represents an arm, which is mounted in any suitable manner adjacent to the clutch, and held in an upright position by means of a spring, F, suitably applied.

To an outwardly-projecting piece, $a'$, of the arm E is attached a cord or chain, G, which passes over a pulley, $b$, connected to a frame or support, H, and its end is conveniently accessible to the operator, as at $b'$. To the chain G is also connected a cord or chain, G', to which is attached a pin, J, adapted for securing the lever K, by which the shifting box A' of the clutch is moved and held against the fixed clutch.

The operation is as follows: When it is desired to clutch the two-part shaft B, the lever K is properly moved so as to force the shifting box A' to an engaging contact with the fixed box A, and the pin J is then inserted in an opening of a cross-bar, $d$, suitably supported, whereby separation of the clutch is prevented.

When it is desired to throw off the clutch, the cords or chains G G' are operated, whereby the pin J is withdrawn from the bar $d$ and the arm E advanced against the periphery of the clutch. The tapering end $e$ of said arm enters the space between the flanges C D, and, bearing against the flange C, it presses the flange D, thus acting as a wedge, and forcing the box A' from the box A, the effect whereof is to render the clutch inoperative. During this operation the flange C sustains the end of the arm E, and prevents breakage thereof by the strain of the flange D and movable box of the clutch, this being occasioned by one side of the end $e$ of the arm being right-lined or flat and abutting against the flat side of the flange C, while the other side of said end is diagonal, to accord with and abut against the helical flange D of the box A'.

By the connection of the cords or chains G G' the pin J is withdrawn from the cross-bar $d$ simultaneously with advance of the arm E to the clutch.

The thrust of the arm E between the boxes A A' unfailingly separates them and prevents sticking or binding of the same.

An advantage of my invention when applied to rolling-mills (as well as to other machinery) is, that the rolls are under immediate and positive control of the boss roller, and the train may be instantly stopped in case of necessity.

The arm E may be made to slide, instead of having a swinging motion, without, however, varying its operation.

Having thus described my invention, what I claim as new, and desire to secure by Letters Patent, is—

1. The clutch-boxes A A', with flanges C D, in combination with the throw-off arm E, overhead cord or chain G, and spring F, substantially as and for the purpose set forth.

2. The clutch-boxes A A', in combination with throw-off arm E, spring F, shipper K, and fastening J, and the connected cords or chains G G', substantially as and for the purpose set forth.

WILLIAM LLOYD.

Witnesses:
SAML. M. GRICE,
JOHN A. WIEDERSHEIM.